US006789093B2

(12) United States Patent
Obuchi et al.

(10) Patent No.: US 6,789,093 B2
(45) Date of Patent: Sep. 7, 2004

(54) METHOD AND APPARATUS FOR LANGUAGE TRANSLATION USING REGISTERED DATABASES

(75) Inventors: Yasunari Obuchi, Kokubunji (JP); Atsuko Koizumi, Sagamihara (JP); Yoshinori Kitahara, Tachikawa (JP); Seiki Mizutani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 338 days.

(21) Appl. No.: 09/811,560

(22) Filed: Mar. 20, 2001

(65) Prior Publication Data

US 2002/0046206 A1 Apr. 18, 2002

(30) Foreign Application Priority Data

Oct. 17, 2000 (JP) ........................................ 2000-321920

(51) Int. Cl.[7] .............................................. G06F 17/00
(52) U.S. Cl. .......................... 707/104.1; 707/3; 707/10; 704/277
(58) Field of Search ...................... 707/3, 9, 10, 104.1; 704/251, 277, 1, 7; 379/88.05, 88.06

(56) References Cited

U.S. PATENT DOCUMENTS

| 4,984,177 A | * | 1/1991 | Rondel et al. ............... 704/277 |
| 5,384,701 A | * | 1/1995 | Stentiford et al. ............. 704/3 |
| 5,848,389 A | * | 12/1998 | Asano et al. ................ 704/239 |
| 5,991,711 A | * | 11/1999 | Seno et al. ..................... 704/3 |
| 6,085,162 A | * | 7/2000 | Cherny ........................ 704/277 |
| 6,134,549 A | * | 10/2000 | Regnier et al. ................. 707/9 |
| 6,161,082 A | * | 12/2000 | Goldberg et al. ............... 704/3 |
| 6,243,669 B1 | * | 6/2001 | Horiguchi et al. .............. 704/9 |
| 6,266,642 B1 | * | 7/2001 | Franz et al. ................. 704/277 |
| 6,330,530 B1 | * | 12/2001 | Horiguchi et al. .............. 704/4 |
| 6,336,114 B1 | * | 1/2002 | Garrison ........................ 707/9 |
| 6,374,224 B1 | * | 4/2002 | Horiguchi et al. ........... 704/266 |
| 6,438,524 B1 | * | 8/2002 | Shi ............................ 704/277 |
| 2002/0010590 A1 | * | 1/2002 | Lee ............................ 704/277 |

FOREIGN PATENT DOCUMENTS

JP          09-065424          3/1997

* cited by examiner

Primary Examiner—Safet Metjahic
Assistant Examiner—Brian Goddard
(74) Attorney, Agent, or Firm—Reed Smith LLP; Stanley P. Fisher, Esq.; Juan Carlos A. Marquez, Esq.

(57) ABSTRACT

A method and apparatus for providing an interpretation service are disclosed. The method includes the steps of receiving an incoming telephone call from a user, forming a plurality of databases, receiving at least one user information item via the incoming telephone call, searching at least one of the plurality of databases for at least one sentence correspondent to the at least one information item, outputting a translation from at least one of the plurality of databases of the at least one sentence correspondent to the at least one information item, and outputting, in audio on the incoming telephone call, the translation. The apparatus includes an interpreter and a registration service. The registration service includes a private information manager that receives an incoming telephone call from a user, wherein the private information manager manages a plurality of databases, wherein the plurality of databases includes at least one database of sentences registered to the individual user.

20 Claims, 11 Drawing Sheets

FIG. 2

| USER | INSIDE OF SERVER | RESPONSE |
|---|---|---|
| CALL UP | AUTOMATICALLY DETECT THE USER USING NOTIFICATION OF CALLER ID | 「通訳サービスです。日本語をどうぞ」 |
| | LOAD BASIC SENTENCES AND START THE RECOGNITION | |
| 「WATASHI NO NAMAE HA SUZUKI ICHIRO DESU」 | RECOGNIZE THE SPEECH AND REPEAT THE RESULT | 「WATASHI NO NAMAE HA SUZUKI ICHIRO DESU」 |
| PUSH BUTTON 1 | DETECT PB SOUND AND PLAY BACK THE TRANSLATION | "My name is Ichiro Suzuki" |
| PUSH BUTTON 2 | DETECT PB SOUND AND START THE RECOGNITION | |
| 「BYOUIN NO KAIWA」 | RECOGNIZE THE SPEECH | 「BYOUIN DE TSUKAU BUN WO DOUZO」 |
| | LOAD CONVERSATION IN A HOSPITAL AND START THE RECOGNITION | |
| 「WATASHI HA KOUKETSUATSU-SHOU DESU」 | RECOGNIZE THE SPEECH | 「WATASHI HA KOUKETSUATSU-SHOU DESU」 |
| PUSH BUTTON 1 | DETECT PB SOUND AND START THE RECOGNITION | "I have high blood presuure" |

FIG. 3

```
ID : 100
Name : 鈴木一郎
Phone : 090-1234-5678
Password : abcd1234
```

BASIC SENTENCES
    こんにちは。　　Hello.
    ありがとう。　　Thank you.
    私の名前は鈴木一郎です。　　My name is Ichiro Suzuki.
    ヒルトンに泊まっています。　　I'm staying in Hilton.
    いくらですか。　　How much ?
    これは何ですか。　　What is this ?
病院の会話
    熱があります。　　I have a fever.
    おなかが痛いです。　　I have a stomachache.
    私は高血圧症です。　　I have high blood pressure.
買物の会話
    現金で払います。　　I'll pay in cash
    ヒルトンに届けて下さい。　　Deliver it to Hilton, Please.

FIG. 5

AN EXAMPLE OF ADDITION — 502

To : touroku@xxx
From : suzuki-ichiro@yyy
Subject : APPEND password : abcd1234
私の名前は鈴木一郎です。(BASIC SENTENCE)
私は高血圧症です。(CONVERSATION IN A HOSPITAL)

AN EXAMPLE OF DELETION — 504

To : touroku@xxx
From : suzuki-ichiro@yyy
Subject : DELETE password : abcd1234
喫煙席をお願いします。  (BASIC SENTENCE)
妊娠しています。   (CONVERSATION IN A HOSPITAL)

AN EXAMPLE OF CHANGE — 506

To : touroku@xxx
From : suzuki-ichiro@yyy
Subject : MOVE password : abcd1234
私は高血圧症です。(CONVERSATION IN A HOSPITAL → BASIC SENTENCE)

METHOD AND APPARATUS FOR LANGUAGE TRANSLATION USING REGISTERED DATABASES

REFERENCE TO FOREIGN PRIORITY APPLICATION

This application claims priority to Japanese Patent Application No. P2000-321920.

BACKGROUND OF THE INVENTION

1. Field of the Invention

The present invention relates to interpretation services, and, more particularly, to a method and an apparatus for interpretation service enabling speech inputted by a user of a telephone to be converted into a foreign language and outputted in the translated form.

2. Description of the Related Art

Persons travelling abroad, or otherwise in need of an oral interpretation service, are often in need of an immediate response to speech in a face-to-face situation. However, in interpretation systems using optional speech recognition, the absence of limitations on the content of the speech, meaning the absence of limitations on the acceptable words to be spoken, often gives rise to extremely frequent errors in recognition, which hampers prompt and/or correct responses. Furthermore, when the speech is to be translated from any input language into a foreign language, mistranslation is also frequent.

For a speech input system involving a closed universe of interpretation, meaning that the required contents of the speech are known in advance, techniques are available that recognize typical expressions with high accuracy, due to the limited universe of words necessary for inclusion in the knowledge base. This limited universe leads to a increase in the predictability of the contents of the speech, and a correspondent increase in the accuracy of speech recognition. Where a closed universe recognition technique for typical spoken sentences limited to particular contents is used as an interpretation service, the difficulties of incorrect recognition and/or translation will be partially solved, but a new difficulty arises in that the statement that the user needs to have translated may not registered or known, and consequently that statement cannot be effectively translated.

Japanese Patent Application No. 65424/1997 discloses one example of a speech interpretation system using a speech recognition server and a radio mobile terminal. This speech interpretation system recognizes speech input through a telephone, converts it into a foreign language and outputs it in the translated form by using an optional speech recognition technique with no limitation on the contents of speech. However, this technique is subject to the same limitations discussed hereinabove.

Therefore, the need exists for an interpretation service that allows the user access to a plurality of translatable phrases, thereby increasing the probability that the statement will be recognized by the interpretation service, while increasing the likelihood that a particular phrase necessary to the user will be found in the universe of translatable phrases.

SUMMARY OF THE INVENTION

The present invention is directed to a method of providing an interpretation service. The method includes the steps of receiving an incoming telephone call from a user, forming a plurality of databases, wherein the plurality of databases includes at least one sentence registered to individual user, receiving at least one user information item via the incoming telephone call, searching at least one of the plurality of databases for at least one sentence correspondent to the at least one information item, outputting, according the step of searching, a translation, from at least one of the plurality of databases, of the at least one sentence correspondent to the at least one information item, and outputting, in audio on the incoming telephone call, the translation of the at least one sentence correspondent to the at least one information item.

The method may additionally include the steps of registering the user to access at least one of the at least one sentences registered to individual user database, and authorizing the user to access the at least one sentences registered to individual user database correspondent to that user. This authorization may be performed by identifying the user by a telephone number on caller identification, a telephone push button username, a username spoken by the user, a telephone push button password, or a password spoken by the user, for example.

The method may additionally include the steps of receiving a registered sentence manipulation command from the user, and manipulating the at least one sentence registered to the individual user, according to the registered sentence manipulation command from the user. This receiving may be via an email, a browser connection, or the incoming telephone call. The manipulating may include adding a new sentence to the at least one sentences registered to individual user database correspondent to the user, deleting a sentence from the at least one sentences registered to individual user database correspondent to the user, or editing a sentence in the at least one sentences registered to individual user database correspondent to the user. The manipulated sentence may then be registered into that user's database. Alternatively, prior to registration, a foreign language translation of the manipulated sentence may be outputted, and the user may approve or disapprove the translation. If the user disapproves, the manipulated sentence may be sent to a human translator.

The present invention is also directed to an interpretation service. The invention service includes an interpreter and a registration service. The user may call the interpreter via telephone, and receive a translation of an input sentence. The registration service includes a private information manager that receives an incoming telephone call from a user, wherein the private information manager manages a plurality of databases, wherein the plurality of databases includes at least one database of sentences registered to the individual user. An authentication server preferably identifies the user as a user authorized to access at last one of the registered sentence databases. The registration service receives at least one user information item via the incoming telephone call, and searches at least one of the plurality of databases for at least one sentence correspondent to the at least one information item. The registration service outputs a translation, from at least one of the plurality of databases, the at least one sentence correspondent to the at least one information item, in audio on the incoming telephone call.

The interpretation service may additionally include, among the plurality of databases, a public sentence database, and an additionally registered sentence database. The additional sentence database is preferably accessed through the private information management server via voice, email, or intra/internet, and the additional sentences include new, edited, or deleted sentences for inclusion in the database of registered sentences.

The present invention provides an interpretation service, including a registration service, to access, via telephone, internet, and the like, to create and edit a collection of sentence examples available to that user for translation. This enables the user not only to rely on the interpretation service for a sentence translation, but also ensures an accurate and prompt response while increasing the probability that the statement will be recognized by the interpretation service. Further, using the organization of the present invention, the likelihood is increased that a particular phrase necessary to the user will be found in the universe of translatable phrases.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 2 is a graphical table illustrating the flow of actions the user would perform when using an interpretation service;

FIG. 3 is a graphical table illustrating exemplary contents in a collection of registered sentences for individual;

FIG. 5 is a flow table illustrating an exemplary embodiment of sentence contents registered via e-mail;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical interpretation service. Those of ordinary skill in the art will recognize that other elements are desirable and/or required in order to implement the present invention. However, because such elements are well known in the art, and because they do not facilitate a better understanding of the present invention, a discussion of such elements is not provided herein. Although the embodiments presented hereinbelow concern translation of an input in Japanese into an output in English, it will be apparent to those skilled in the art that the invention can be effectively implemented for virtually any input and/or output language. Thus, although the Japanese characters used throughout may not be directly translatable, either to a pronunciation using Arabic letters or to an English phrase, the Japanese to English system disclosed herein is exemplary only, and it will be apparent to those skilled in the art the necessary variations necessary for languages in which no direct translation is available.

Figure 1:
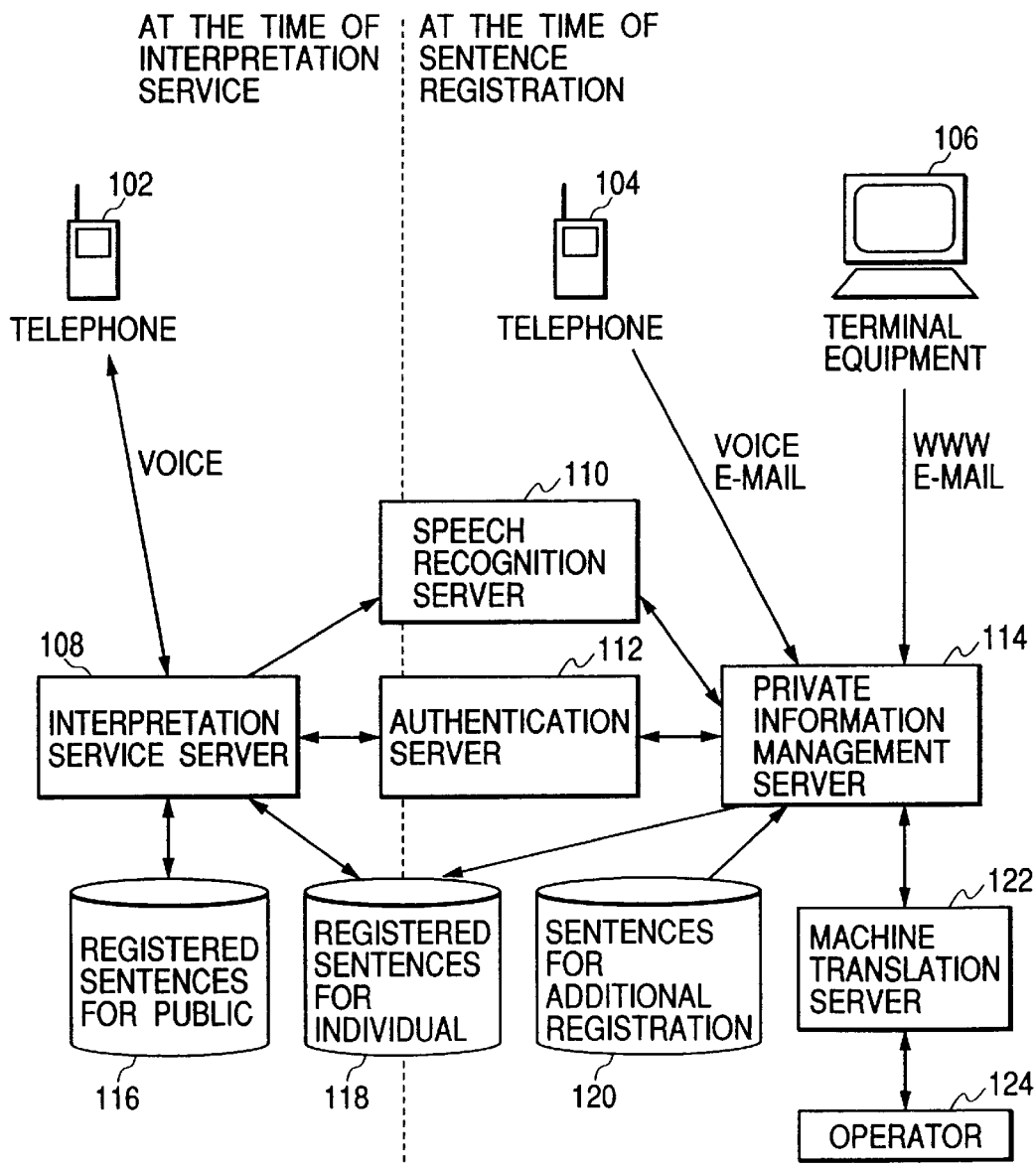
FIG. 1 is a block diagram illustrating one embodiment of a telephone-based interpretation and sentence registration service method, and an interpretation and sentence registration service apparatus.

FIG. 1 is a block diagram illustrating one embodiment of a telephone-based interpretation and sentence registration service method, and an interpretation and sentence registration service apparatus. The interpretation service is illustrated to the left of the dotted line in FIG. 1, and is preferably accessed via a telephone, and, more specifically, via a cellular or other portable telephone 102. In the interpretation service, the user calls an interpretation service server 108 from the telephone set 102. The interpretation service server identifies the user using an authentication server 112, and extracts registered sentences for the user from a database of registered sentences for individual users 118. An input in the user's voice is then recognized by a speech recognition server 110, translated into a foreign language matching the contents of the input, and outputted in the translated format. The user may instruct the service to use a particular collection of registered sentences for the exclusive use of that user. If the authentication server gives a response that the user is not registered, or if the user does not have access to any exclusive use registered sentences, a plurality of registered sentences designated for use by the public 116 are accessed. Public sentences may additionally be available to users also having registered sentences, and those users having registered sentences may select which of the public sentences are available for use by that registered user, although it will be apparent to those skilled in the art that the total number of sentences available to each user should be kept relatively small, such as less than 100 sentences total, in order to avoid the translation difficulties discussed hereinabove.

To the right of the dotted line, FIG. 1 illustrates the sentence registration system. In order to register a sentence, a terminal 106 is used to access the sentence registration system. As used herein, a terminal includes a personal computer, personal digital assistant, and a telephone set 104, for example. The user accesses a private information manager 114, which may be, for example, a server, from the terminal via telephonic, voice over IP, email, internet, or internet, for example, preferably in the voice of the user.

The private information manager 114, using an authentication server 112, preferably identifies the user, such as by voice pattern or password, and accesses registered sentences matching that user from the database of registered sentences for individuals 118, which may be a database or server, for example. The private information manager 114 may be used to add, alter, delete, or otherwise process a sentence or sentences into, within, or from, the collection of registered sentences for the individual accessing the registered sentence database 118. A new sentence or sentences may be composed, or an existing sentence may be selected from the sentences for additional registration 120, which sentences for additional registration are preferably prepared in advance, such as by the system provider or manager. Additionally, because it is necessary to translate these additional sentences into a foreign language, these sentences for additional registration preferably have respective foreign language versions entered in advance. Alternatively, the additional sentence may be transferred to the automated translation server 122 for translation into a foreign language. Alternatively, if the additional sentence is substantially non-translatable by the automated translation server, the additional sentence may be transferred to an operator 124 for non-automated translation. Further, when the user registers an additional sentence from the terminal, manipulation and/or translation of the additional sentence may be performed via the speech recognition server 110.

FIG. 2 is a graphical table illustrating the flow of actions the user would perform when using an interpretation service according to the present invention. First, the user dials the telephone number of the interpretation service. The authentication server, utilizing, for example, a notification of caller ID function, a password, such as by ID and password entry via push-button, or speech recognition, identifies the user. Once the user is identified, in an embodiment wherein the user speaks Japanese, the authentication server may respond, for example, "Tsuyaku sabisu desu. Nihongo de dozo", which, in English, translates as "This is the interpretation service. Go ahead in Japanese, please", and the basic sentences are loaded from the collection of registered sentences for the individual for that particular user, and speech recognition for those registered sentences is begun.

If, for example, the user responds, in Japanese, "Watashi no namae wa Suzuki Ichiro desu", which, in English, translates as "My name is Ichiro Suzuki", the server performs speech recognition of the user's response, and preferably repeats the recognition result to the user. The user, if the repeated speech is correct, alerts the server to the correct recognition, such as by pressing a key or keys on the terminal, such as #1, for example, to thereby instruct translation and playback of the translated speech. The server recognizes the translation instruction, such as by recognition of the push button sound for #1, and plays back the English version of the recognized sentence. In a preferred embodiment, the user may repeat the reproduced sound as often as required or desired, such as by pressing the button #1 repeatedly in order to, with each press, instruct repeated playback. When the user approves the result, the user may exit the system, such as by pressing an exit key or keys, or may input the next sentence, such as by pressing a button #2, for example.

The user may, for example, desire to enter sentences for use in a hospital, instead of other basic registered sentences. In such a circumstance, the user may voice a command phrase instructing a change in use-type, such as by speaking aloud "Conversation in a hospital." Alternatively, the change in use-type may be entered by, for example, telephone push-button. Where the user is Japanese, the server recognizes the change in use-type command, and preferably responds, for example, "Byoin de tsukau bun o dozo", which translates in English as "Sentences for use in a hospital are ready for you", and substantially simultaneously the system loads the sentences for use in a hospital from the user's collection of registered sentences for the individual. The system then begins speech recognition of these sentences, as discussed hereinabove.

In an exemplary hospital use-type, as in the case of the basic sentences, the server recognizes speech input, such as "Watashi wa koketsuatsusho desu", which translates in English as "I have high blood pressure", repeats the speech input, and, in response to, for example, a push-button input, outputs the English translation.

FIG. 3 is a graphical table illustrating exemplary contents in a collection of registered sentences for individual. Private information items that identify the user, such as the ID, name, telephone number and password of that user, are preferably appended to the collection of registered sentences for that individual. It will be apparent to those skilled in the art that these private information items may alternatively be managed by a different server. The registered sentences are additionally included. As described hereinabove with respect to FIG. 2, the registered sentences may be classified according to a use-type. The exemplary embodiment shown in FIG. 3 includes a conversation in a hospital setting, and a conversation in a retail shopping setting, in addition to basic sentences. Although use-types may be set according to the system, the user may add a new use-types, or delete use-types, as necessary.

Figure 4:
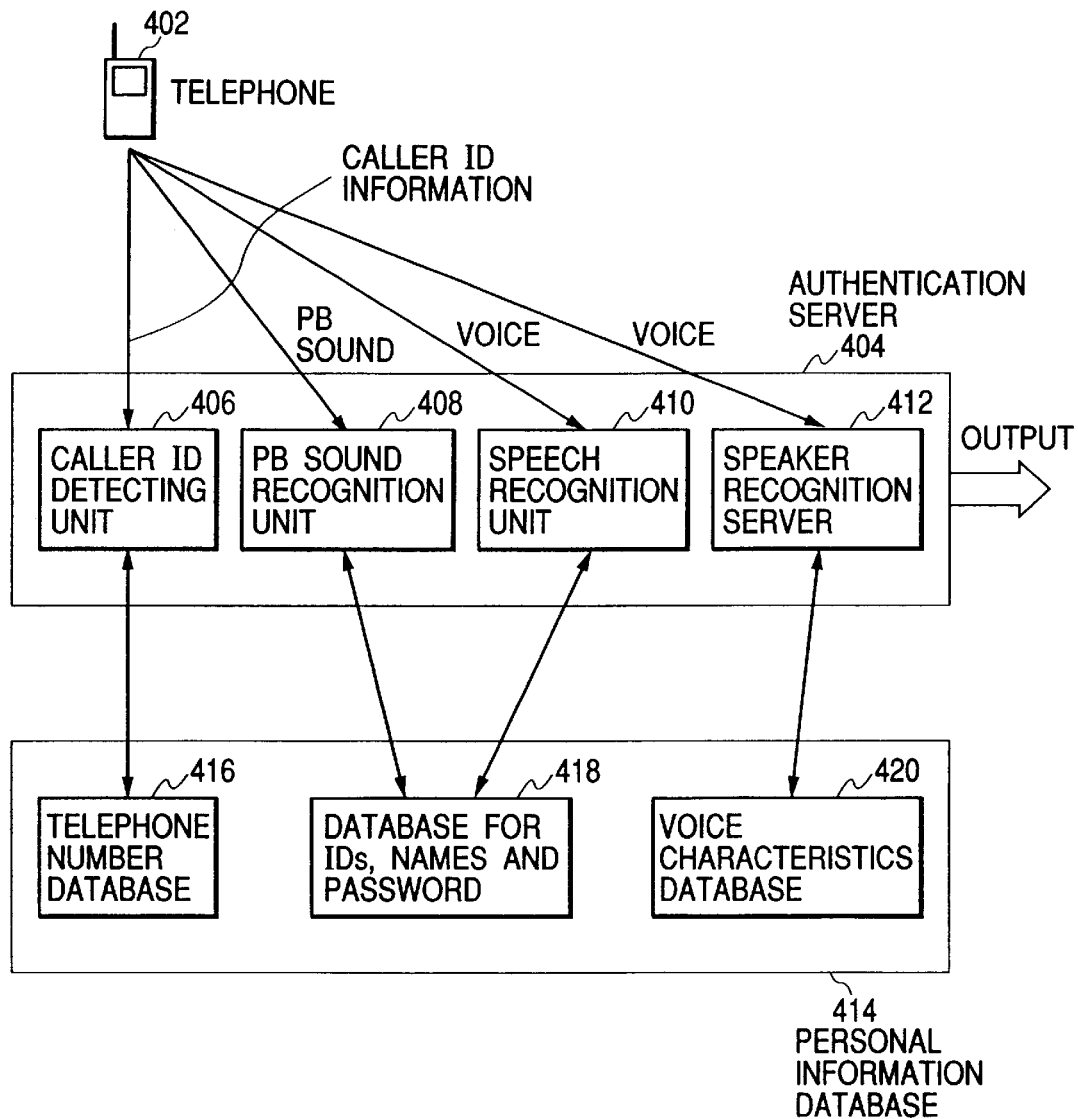
FIG. 4 is a block diagram illustrating an exemplary configuration of the authentication server.

FIG. 4 is a block diagram illustrating an exemplary configuration of the authentication server. Data serving as the basis of authentication may include, for example, a telephone number 416, ID number, name, password 418, and/or voice characteristic 420. Thus, simple personal characteristics or data may be used to identify a user via existing telephone, voice, and/or internet technology. It will be apparent to those skilled in the art that more sophisticated data processing mechanisms, such biological recognition data in the form of a finger print and/or eye scan, may also be used with the resent invention. In an embodiment wherein a telephone number is used, caller ID information sent from a telephone 402 may be detected by a caller ID detecting unit 406, and collated with an authentication database to identify the user. In an embodiment wherein an ID number, name, and/or password is used, a telephone PB sound generated by push-button operation on the telephone set is recognized by a PB sound recognition unit 408, and collated with the authentication database. A user may additionally enter the name or password by speaking, or by keyboard, and collate the recognition result by a speech recognition unit 410 with the authentication database. In an embodiment wherein voice characteristics 420, such as voice print, form the basis of identification, recognition may additionally be accomplished via a speaker recognition unit 412.

FIG. 5 is a flow table illustrating an exemplary embodiment of sentence contents registered via e-mail. In an embodiment wherein sentences are registered via e-mail, in addition to registering an e-mail address for a given user, rules regarding the formatting of e-mail are preferably determined in advance, and registration is then performed by sending from the user of an e-mail conforming with the rules applicable to the designated address. Additionally, the entry of a user's password ma be required in order to prevent alteration by an unauthorized third-party.

Sentences may be added to the registered sentence via email, as shown at step 502. As step 502, the registration is indicated to be an addition via an instruction to the system, such as with the instruction within the subject line "APPEND", and the contents and applicable use-type are then entered into the registered sentence database. Use-type may not be included, and such non-specified sentences as to use-type may, for example, be included in the basic sentence use-type. Further, the inclusion of a password in the email is dependent of the settings for the receiving server for that email. Step 504 is an example of deletion, and, in the example, the contents and applicable use-type of the sentence are entered. In an embodiment wherein no use-type is entered, different rules may be applied, such as deletion of all sentences that meet predetermined criteria, such as a certain percentage of matched words with the requested deletion. Step 504 is an example of a change 506, such as the change of a sentence or of a use-type. In an embodiment wherein a command sentence is used to instruct a change, a class of "commands" may be included, such as options for use-type selection, and this class may be changed, augmented or cleared of unnecessary command sentences.

Figure 6:
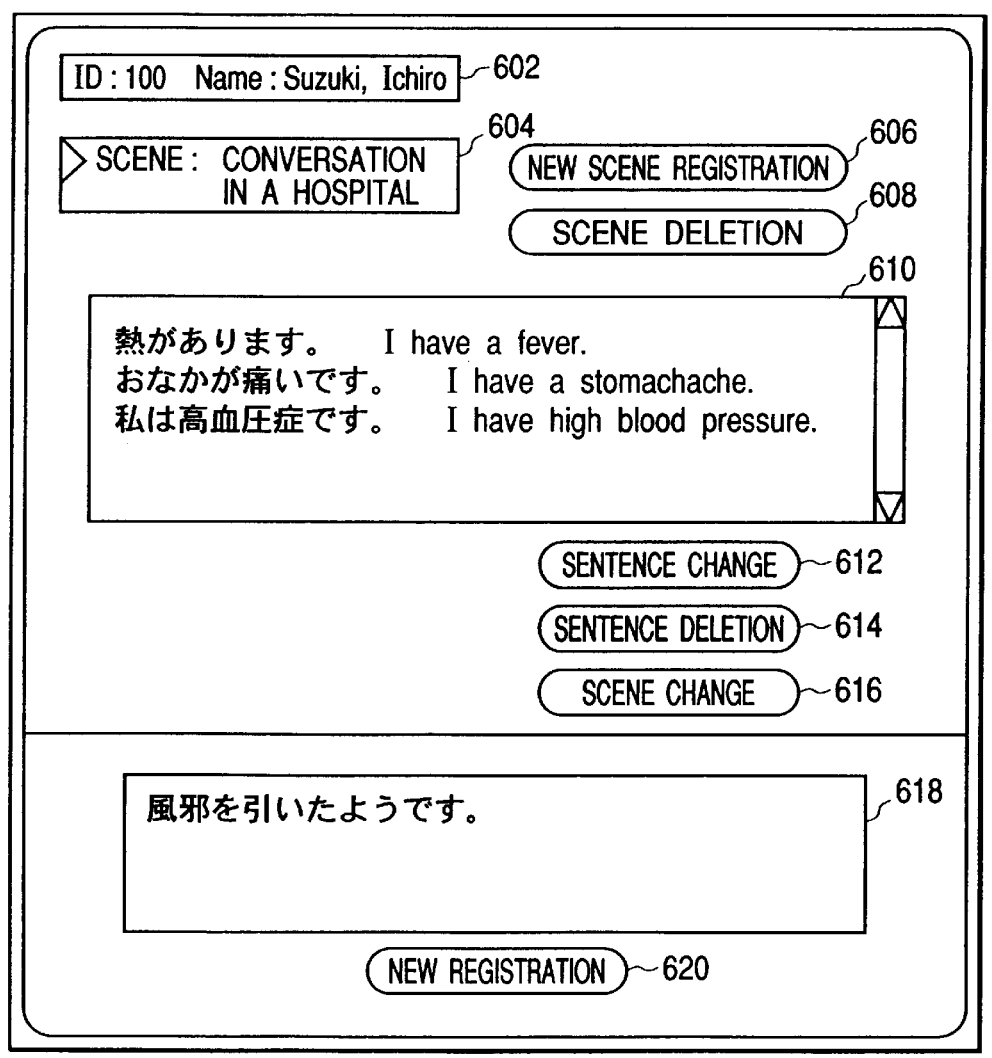
FIG. 6 is a screen shot illustrating an exemplary embodiment of sentence registration using the WWW.

FIG. 6 is a screen shot illustrating an exemplary embodiment of sentence registration using the WWW. The user logs into an individual account, and the illustrated screen is then preferably displayed. In a private information display box 602, the user's ID, name, or the like, is displayed. In a use-type selection/display box 604, the name of the use-type to be edited may be displayed. The use-type may be made selectable by providing the use-type box 604 as a pull-down menu, for example. The screen may additionally include a new use-type registration button 606, a use-type deletion button 608, and additional buttons that make possible registration or deletion of a use-type or types. In a sentence display box 610, sentences involved in a selected use-type may be displayed. If a sentence is to be changed or deleted, the sentence may be selected using a mouse or the like, followed by the pressing of a sentence change button 612, or a sentence deletion button 614. The use-type may be changed using a use-type change button 616. Further, wherein a new sentence is to be registered, the new sentence may be inputted to a new sentence input box 618, and a new registration button 620 may be pressed in order to execute the registration.

Figure 7:
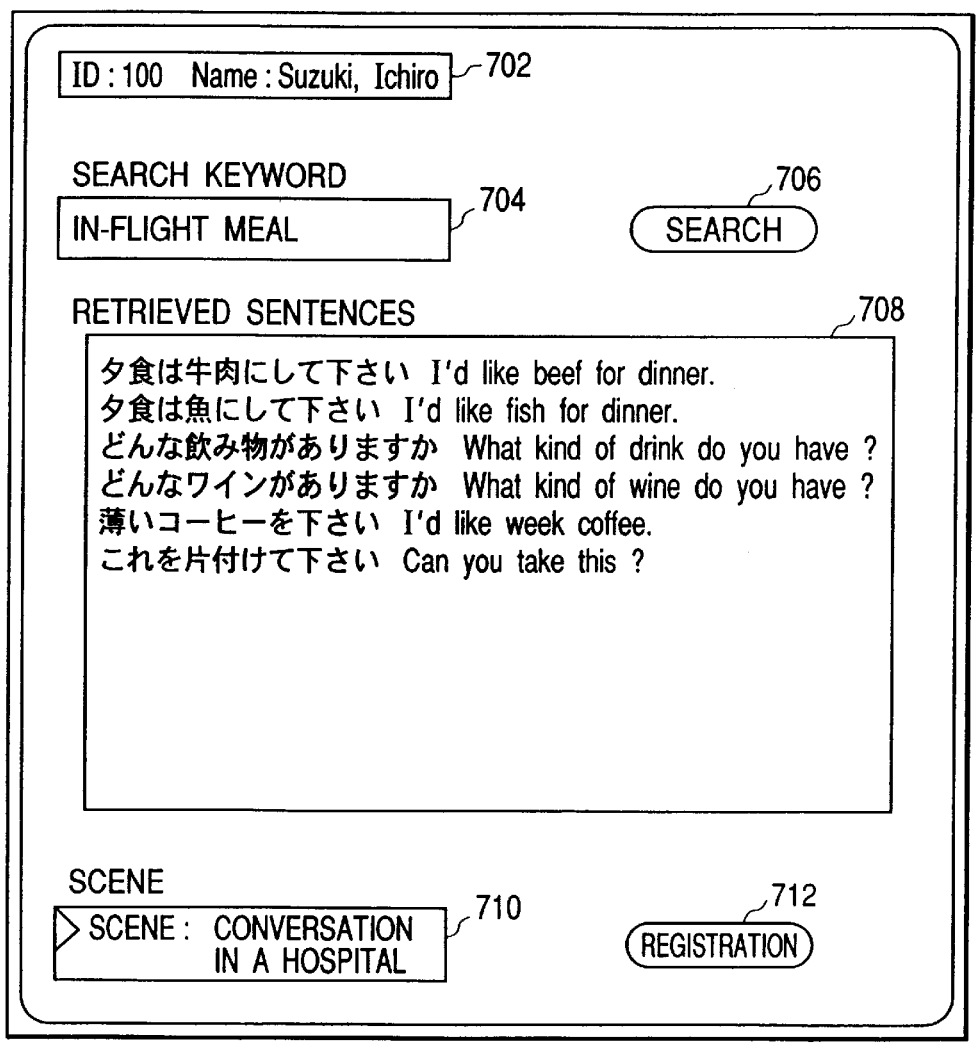
FIG. 7 is a screen shot illustrating an additional exemplary embodiment of sentence registration using the WWW.

FIG. 7 is a screen shot illustrating an additional exemplary embodiment of sentence registration using the WWW. The user, instead of entering a sentence, enters a keyword into the keyword input box 704. When the user presses a search button 704, a sentence or sentences associated with the entered keyword are displayed in a sentence display box 708 from a secondary sentence database stored in the server. The secondary sentence database stored in the server in FIG. 7 is different from the registered sentences readied for the speech interpretation service, and preferably includes a substantially greater number of sentences than the number in the collection of registered sentences for the speech interpretation service. This is due to the fact that, while use for the speech interpretation service requires a high speech recognition rate, and therefore fewer sentences to access and understand, the secondary database searches using strings of characters, and consequently may quickly review larger numbers of sentences, such as a several thousand to a several hundreds of thousands of sentences. Further, because this much greater number of sentences is present in the secondary database, both as native language sentences and translated sentences, accurate translations can be presented quickly. When sentences are displayed according to character string searches, the user can preferably register the displayed sentences from the secondary database into the collection of registered sentences by selecting desired additional sentences and pressing a registration button 712. Use-type matching of sentences from the secondary database may also be performed by activating, for example, a scene selection/display box 710.

Figure 8:
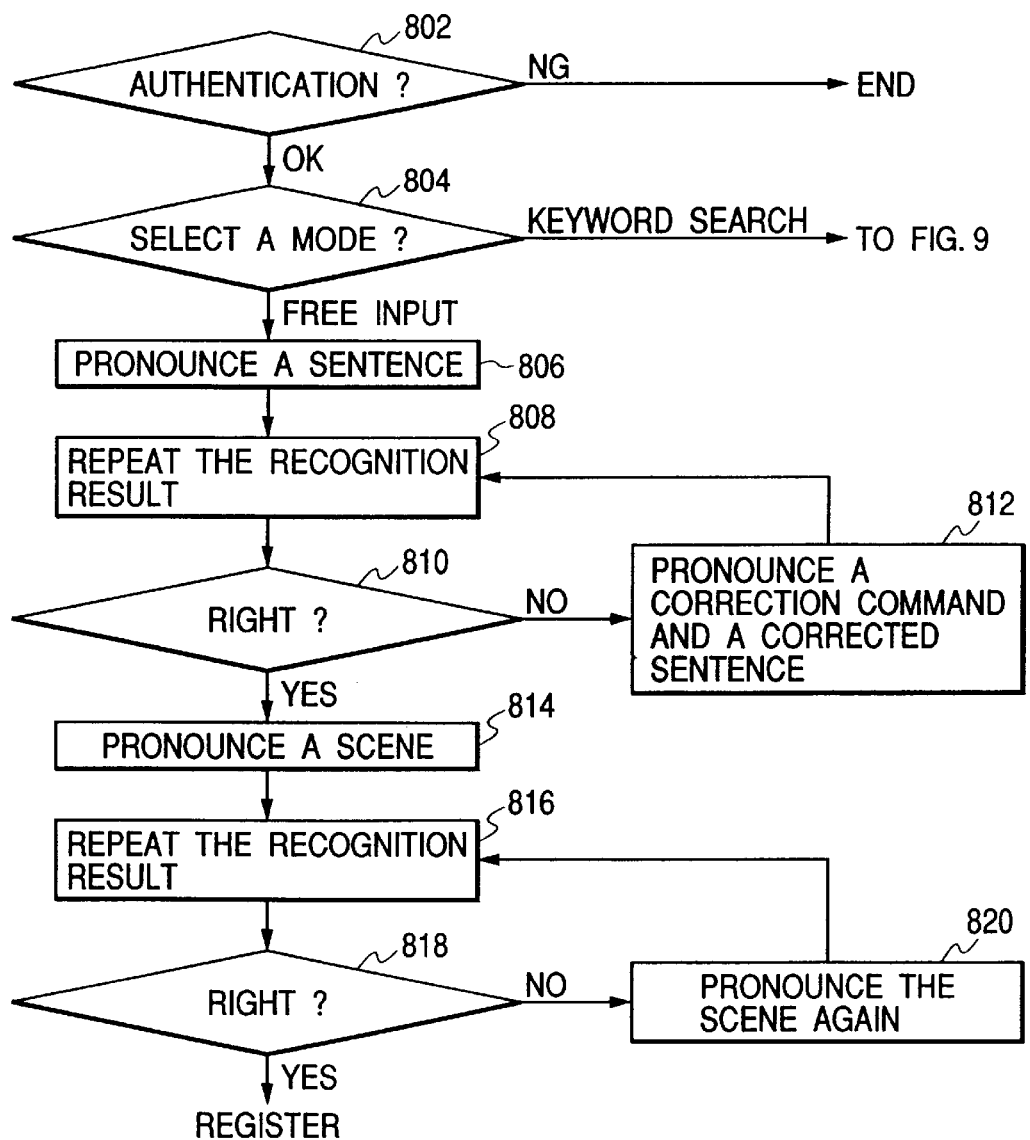
FIG. 8 is a flow diagram illustrating the use of a human voice over a telephone for sentence registration.

FIG. 8 is a flow diagram illustrating the use of a human voice over a telephone for sentence registration. A telephone call emanates from the user, and the server attempts authentication 802 using the methodology described hereinabove with reference to FIG. 4. If the authentication is successfully accomplished, mode selection 804 may be performed. The method may then follow a free input formula, as in FIG. 8, or a keyword search formula, as discussed hereinbelow with respect to FIG. 9. For mode selection, A human voice or a PB sound may be used.

Returning now to the free input formula of FIG. 8, the sentence desired to be registered next is pronounced 806. The server recognizes this speech, and repeats the recognition result 808. The speech recognition at step 808, unlike the sentence recognition used by the speech interpretation service discussed hereinabove with respect to FIG. 1, is a sentence recognition that accepts linking of words in any pattern. Although the recognition rate of the optional sentence recognition at step 808 is low, and correct recognition is seldom achieved on the first attempt, a correct recognition may be achieved in a simple manner. The user listens to the result of speech recognition repeated, and judges the correctness 810. If the recognition is not correct, the user speaks a correction command and a corrected sentence 812. The correction command and corrected sentence may be spoken or entered in a variety of ways, such as the pronunciation of the incorrect portion of the sentence again, or by the pronunciation of a corrected sentence portion immediately following a repetition of the incorrect portion. Each time a correction is made, the server preferably repeats the updated result of the recognition, and the cycle is repeated until the correct recognition result is obtained. Once the sentence is correct, then a us-type is pronounced 814, the result of the recognition is repeated 816, the user judges whether the recognition is correct 818, the recognition, if incorrect, is corrected by re-pronunciation 820, and the sequence is repeated until the correct use-type is obtained. When the correct sentence and the use-type are obtained, the sentence is registered as one of the registered sentences for that individual.

Figure 9:
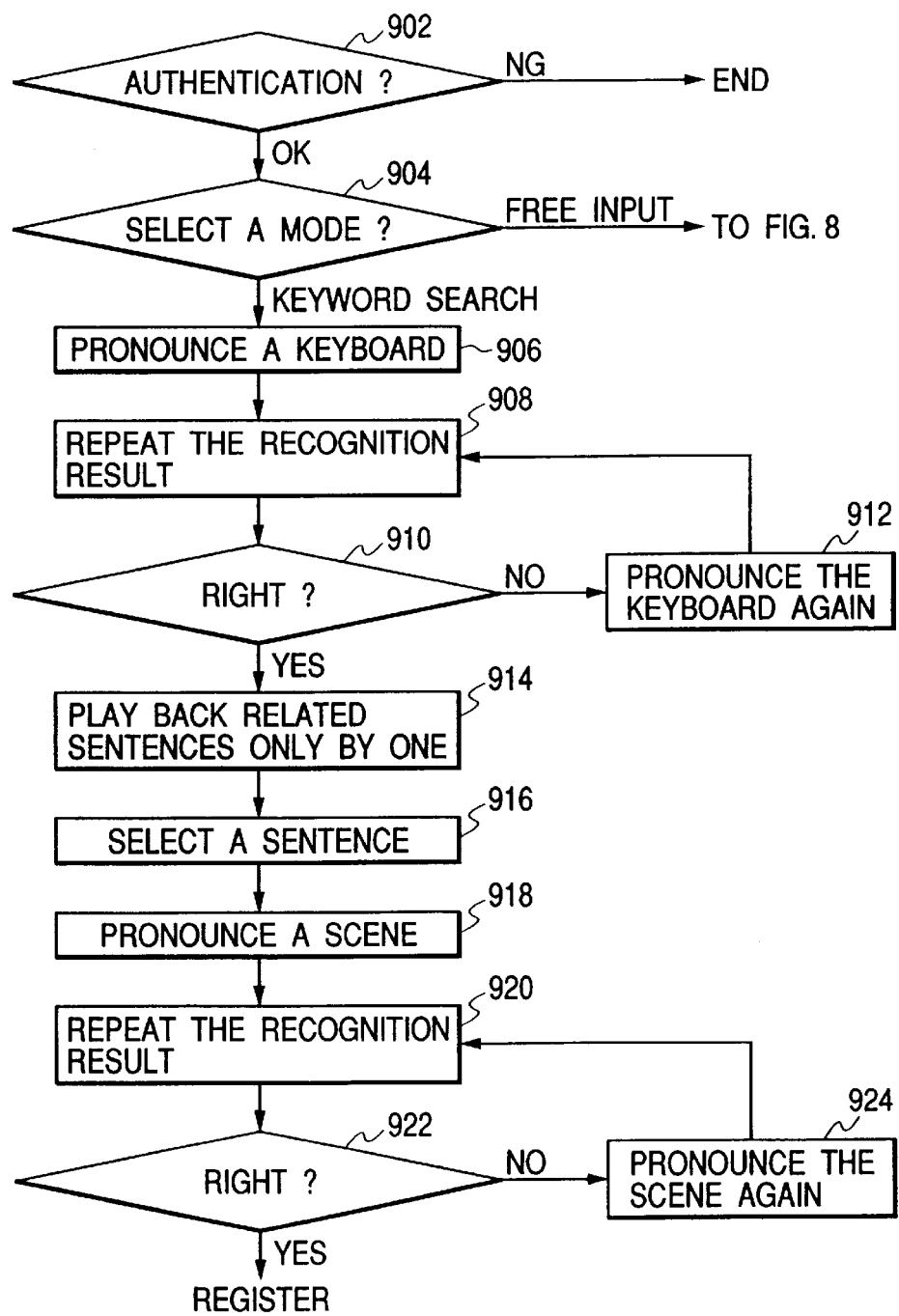
FIG. 9 is a flow diagram illustrating an exemplary embodiment of sentence registration using the human voice over a telephone.

FIG. 9 is a flow diagram illustrating an exemplary embodiment of sentence registration using the human voice over a telephone. If a keyword search is selected at a mode selection step 904, the user pronounces a keyword 906. The server recognizes this speech, and repeats the recognition result 908. Preferably, in this embodiment, the speech recognition is an isolated word recognition based on a word, rather than on a sentence. The user listens to the result of the speech recognition, and judges whether it is correct 910. If the recognition is not correct, the user pronounces the keyword again 912, and the above methodology is repeated until a correct recognition result is obtained. Alternatively, by entering a request, such as by pressing a button or the like, the user may successively play back second, third and subsequent candidates for the speech recognition result, and select the correct word inputted when that correct word is played back. Once the correct keyword is obtained, the server may successively reproduce sentences associated with this keyword 914. A database such as that discussed hereinabove with respect to FIG. 7 may be used for the generation of the keyword and the successive sentences. The user selects, such as by push-button operation or the like, the desired sentence 916 from the successive sentences, and then enters a use-type as discussed hereinabove with respect to FIG. 8.

Figure 10:
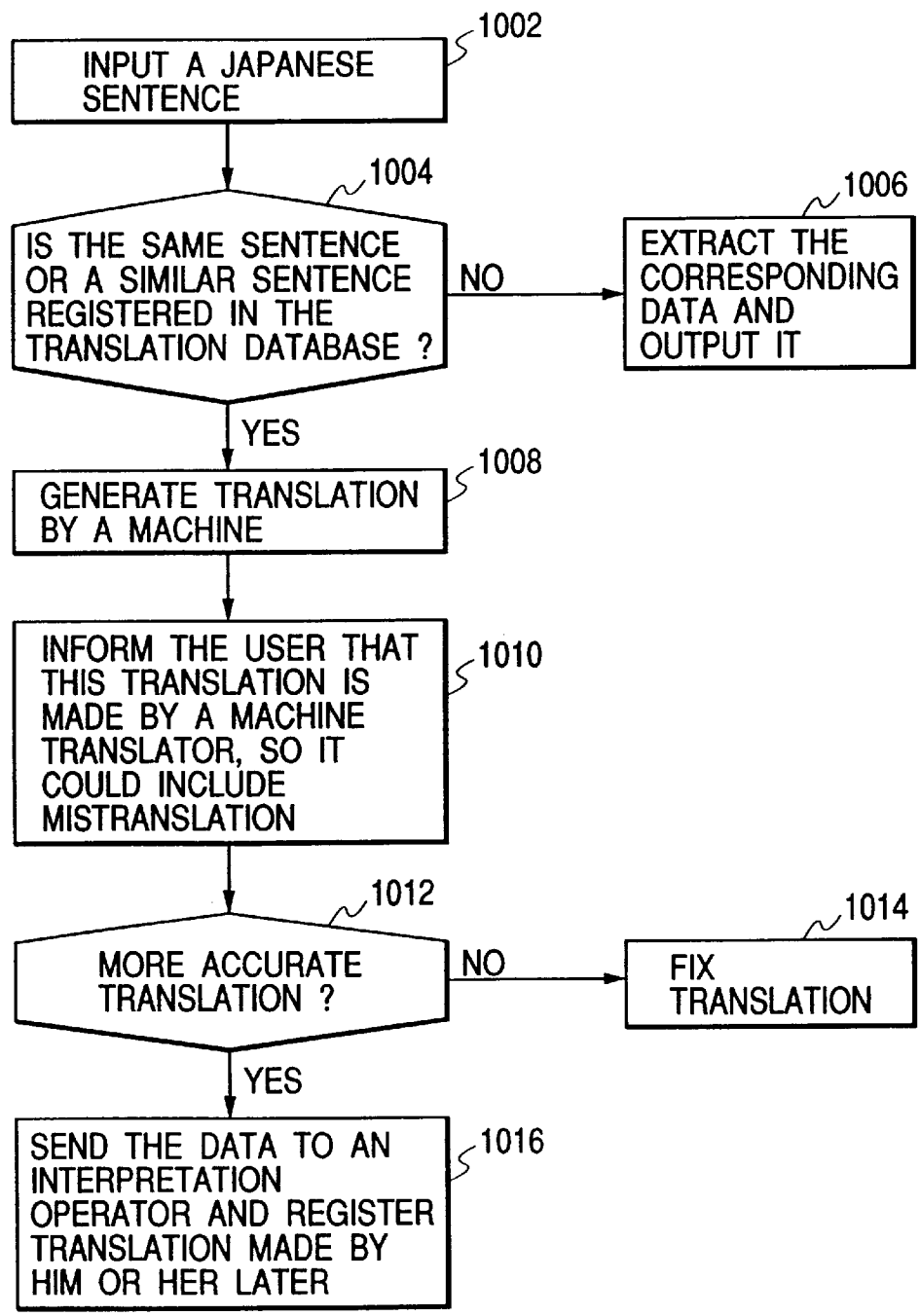
FIG. 10 is a flow diagram illustrating the preparation of a translation of a sentence desired to be registered.

FIG. 10 is a flow diagram illustrating the preparation of a translation of a sentence desired to be registered. Once the user enters a sentence in a first language, such as Japanese, via the methodology described hereinabove with respect to FIGS. 5 through 9 1002, the entered sentence is checked against the bilingual database the server is equipped with 1004, in order to determine whether the sentence is the same, or similar to, a sentence included in the bilingual database. Generally, the sentence database used in FIGS. 7 through 9, and the bilingual database used in FIG. 10, are managed together, and, thus, if each sentence in the bilingual database of FIG. 10 is provided with a translation and stored bilingually, a translation will become available for each sentence registered in accordance with FIGS. 7 through 9. Additionally, for a sentence resulting from a simple replacement of one word or a few words in another sentence included in the database, a translation may be simplistically prepared by replacing just the corresponding word or words. In an embodiment wherein a simple replacement sentence is involved, the corresponding data is extracted and outputted as a translated sentence 1006. If neither the same sentence nor a similar one is found in the bilingual database, a translation may be prepared using the machine translation system 1008. When a translation prepared by he machine service is to be registered into the collection of registered sentences for the individual, the system preferably notifies the user, for example, that "This translation has been made by a machine translator, an consequently may include mistranslation" 1010. The user may then either approve the machine translated sentence, and risk some inaccuracy, or the user may demand a more accurate translation 1012. In a preferred embodiment, there are additional costs to the user associated with a demand for a more accurate translation. If the user answers "I need no more accurate translation", the translation made by the machine translator is fixed 1014, and registered among the registered sentences. If the user answers "I need a more accurate translation", the sentence may be sent to a human interpretation operator for translation by a human translator, and then subsequently registered 1016.

Figure 11:
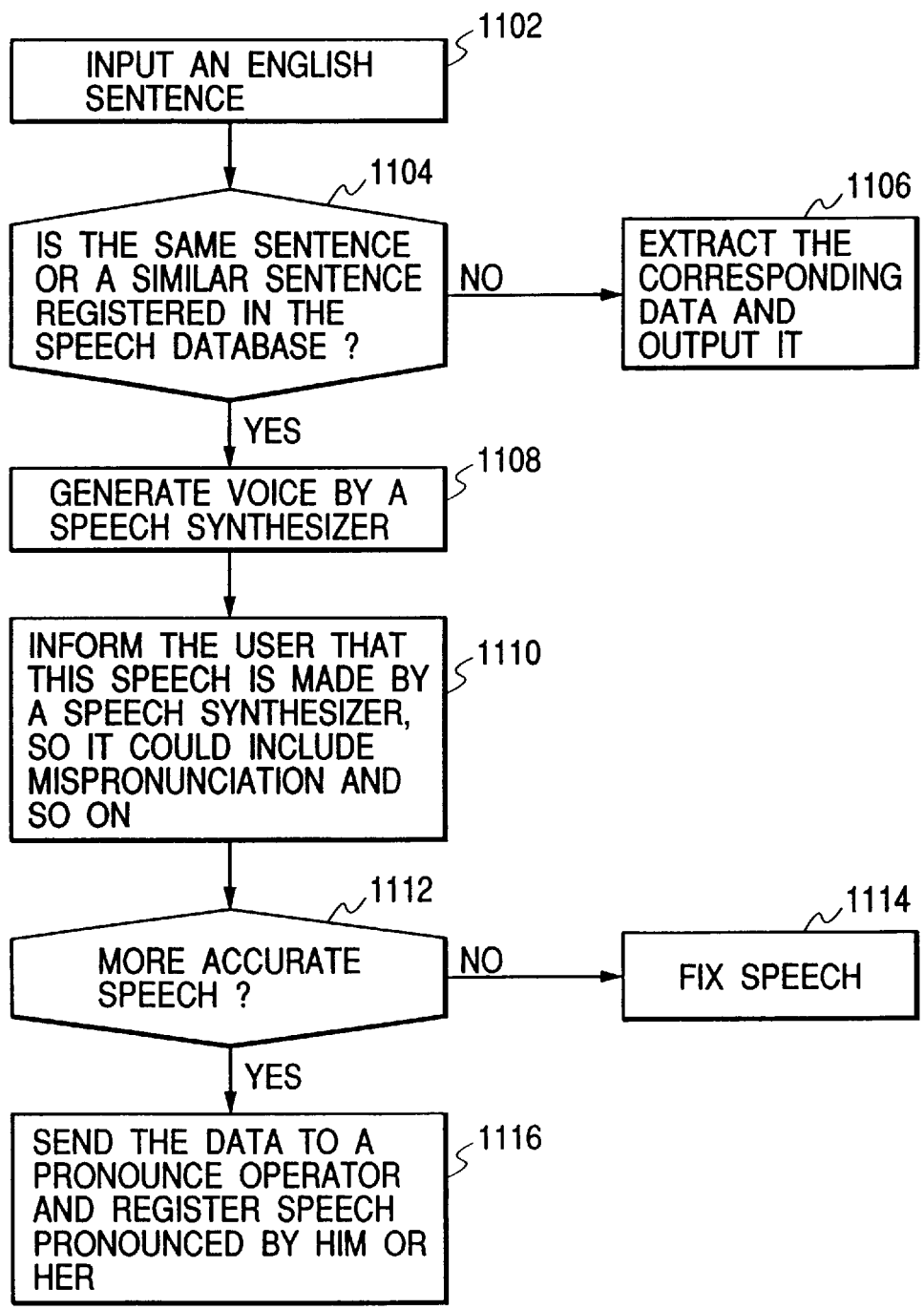
FIG. 11 is a flow diagram illustrating the generation of an oral output for a sentence desired to be registered.

FIG. 11 is a flow diagram illustrating the generation of an oral output for a sentence desired to be registered. Generation of an oral output is accomplished within substantially the same framework as that referred to with respect to FIG. 10. Thus, when an English sentence is entered 1102, for example, the speech database is searched for the same sentence or a similar one 1104, and, if one is found, it is outputted as it is 1106. If the same or a similar sentence is not found, a new one is prepared by the speech synthesizer 1108, i.e. by the machine translator. If neither the same nor a similar sentence is found, an error or an unnaturalness in pronunciation, rhythm, or the like may result, and the user is notified 1110 accordingly. The user is then asked whether the user accepts the translation as it is, or whether the user desires a more accurate translation 1112. If the user accepts the translation, the translation is fixed as the oral output 1114. If the use does not accept the translation, the operator generates and registers an output of improved correctness 1116.

The present invention enhances the accuracy of speech recognition, and enables a user to access the most necessary and desirable sentence for that particular user. Furthermore, if a user desires a sentence to be translated for the first time at the point of dialogue, the user can begin to speak immediately after registering the sentence through a mobile telephone or the like. The quality of translation, and the ease of use, of the present invention is therefore a substantial improvement over prior methods. Other advantages and benefits of the present invention will be apparent to those skilled in the art.

The present invention is not limited in scope to the embodiments discussed hereinabove. Various changes and modifications will be apparent to those skilled in the art, and such changes and modifications fall within the spirit and scope of the present invention. Therefore, the present invention is to be accorded the broadest scope consistent with the detailed description, the skill in the art and the following claims.

What is claimed is:

1. A method of providing an interpretation service, comprising:

receiving an incoming telephone call from a user;

extracting a plurality of databases, wherein the plurality of databases includes at least one database of selected sentences uniquely registered to an individual user, and wherein each of the plurality of databases comprises at least one translation of at least one sentence;

identifying and authenticating the user making the incoming telephone call as a registered user;

accessing, from the plurality of databases extracted in said extracting, ones of the plurality of databases correspondent to the registered user;

receiving at least one user information item via the incoming telephone call;

searching at least one of the accessed ones of the plurality of databases correspondent to the registered user for at least one sentence correspondent to the at least one user information item;

outputting, according to said searching, a translation, from at least one of the plurality of databases, of the at least one sentence correspondent to the at least one user information item; and outputting, in audio on the incoming telephone call, the translation of the at least one sentence correspondent to the at least one user information item.

2. The method of claim 1, wherein the at least one user information item comprises at least one sentence spoken by the user, wherein said searching comprises subjecting the at least one sentence spoken by the user to speech recognition.

3. The method of claim 1, further comprising registering for said identifying and authenticating.

4. The method of claim 3, wherein the user has at least one sentence in the ones of the plurality of databases correspondent to the registered user, and further comprising authorizing the user to access the at least one sentences.

5. The method of claim 4, wherein said authorizing comprises identifying the registered user by at least one criteria selected from the group consisting of a telephone number on caller identification, a telephone push button username, a username spoken by the user, a telephone push button password, and a password spoken by the user.

6. The method of claim 4, further comprising:

receiving a registered sentence manipulation command from the registered user; and manipulating the at least one sentences according to the registered sentence manipulation command from the user.

7. The method of claim 6, wherein said receiving a registered sentence manipulation command from the user comprises receiving via at least one registered sentence manipulation command selected from the group consisting of an email, a browser connection, and the incoming telephone call, and wherein said manipulating comprises at least one action selected from the group consisting of adding a new sentence to the ones of the plurality of databases correspondent to the registered user, deleting a sentence from the ones of the plurality of databases correspondent to the registered user, and editing a sentence in the ones of the plurality of databases correspondent to the registered user, to thereby form a manipulated sentence, the method further comprising:

registering the manipulated sentence into the ones of the plurality of databases correspondent to the registered user.

8. The method of claim 6, further comprising:

outputting of a foreign language translation of the manipulated sentence;

making known to the registered user a relative reliability of the foreign language translation of the manipulated sentence; and sending the manipulated sentence to a human translator upon receipt of a request from the registered user for a foreign language translation having increased relative reliability.

9. The method of claim 8, further comprising:
   detecting whether a sentence similar to the manipulated sentence is included in one of the plurality of databases; and
   assessing the relative reliability of the foreign language translation to be high if a sentence similar to the manipulated sentence is included in one of the plurality of databases.

10. The method of claim 1, wherein said searching comprises first searching the ones of the plurality of databases correspondent to the registered user.

11. The method of claim 1, further comprising:
   receiving an additional registration command from the user, wherein the additional registration command is directed to at least one sentence not in the ones of the plurality of databases correspondent to the registered user;
   registering the at least one sentence not in the ones of the plurality of databases correspondent to the registered user into the ones of the plurality of databases correspondent to the registered user.

12. The method of claim 1, wherein the accessed ones of the plurality of databases correspondent to the registered user comprise at least one public database.

13. The method of claim 1, wherein said identifying and authenticating comprises:
   detecting an identifier telephone number of the incoming call; and
   seeking a user registration associated with the identifier.

14. The method of claim 13, wherein the identifier is at least one identifier selected from the group consisting of a detected telephone number of the incoming call, a push button entry, and a spoken entry.

15. An interpretation service system, comprising:
   a private information manager that receives an incoming contact from a registered user;
   a plurality of databases communicatively connected to and controlled by said private information manager, wherein the plurality of databases includes at least one database of selected sentences uniquely registered to the user;
   an interpretation server that receives at least one user information item via an incoming telephone call from the user, wherein said interpretation server searches at least the at least one database of sentences registered to the user of the plurality of databases for at least one sentence correspondent to the at least one user information item;
   a translation output that outputs, from at least one of the plurality of databases, at least one matched sentence correspondent to the at least one user information item, in audio on the incoming telephone call.

16. The interpretation service system of claim 15, wherein the plurality of databases additionally includes a public sentence database.

17. The interpretation service system of claim 15, wherein the plurality of databases additionally includes an additionally registered sentence database, wherein the additionally registered sentence database is accessed through said private information management server via the incoming contact.

18. The interpretation service system of claim 17, wherein the incoming contact is at least one contact selected from the group consisting of voice, email, intranet, and internet.

19. The interpretation service system of claim 17, wherein the user accesses the additionally registered sentence database and creates at least one additional registered sentence, wherein the additional registered sentence comprises new sentences not in the at least one database of sentences registered to the user, edited versions of sentences in the at least one database of sentences registered to the user, or deleted sentences from the at least one database of sentences registered to the user.

20. The interpretation service system of claim 17, further comprising:
   an authentication server that identifies the user as a user authorized to access at least one of the registered sentence databases.

* * * * *